United States Patent [19]

Davis

[11] 4,429,721
[45] Feb. 7, 1984

[54] INTERLOCKING REFRACTORY SEGMENTS

[75] Inventor: Raymond W. Davis, Burlington, Canada

[73] Assignee: Plibrico (Canada) Limited, Burlington, Canada

[21] Appl. No.: 441,561

[22] Filed: Nov. 15, 1982

[30] Foreign Application Priority Data

Nov. 10, 1982 [CA] Canada ............................. 415368

[51] Int. Cl.³ ..................... F16L 9/22; F27D 3/02
[52] U.S. Cl. .............................. 138/149; 138/158; 138/168; 432/234
[58] Field of Search .............. 138/149, 158, 168; 432/234

[56] References Cited

U.S. PATENT DOCUMENTS

| 1,486,414 | 3/1924 | Brier | 138/158 |
| 3,781,167 | 12/1973 | Ahonen | 138/149 |
| 4,182,609 | 1/1980 | Hovis et al. | 138/149 |
| 4,225,307 | 9/1980 | Magera | 138/149 |
| 4,255,127 | 3/1981 | Skifano et al. | 138/149 |
| 4,312,385 | 1/1982 | Magern | 138/149 |

FOREIGN PATENT DOCUMENTS 1441915  7/1972  United Kingdom ............... 432/234

Primary Examiner—John W. Shepperd
Attorney, Agent, or Firm—Fetherstonhaugh & Co.

[57] ABSTRACT

Interlocking refractory segments for use in insulating pipes and the like are each formed with wire anchors embedded therein. The anchors have exposed ends at each side edge of the refractory segment. The exposed ends of one segment are formed so as to interlock with the exposed ends of a second segment so as to secure the segments in a fixed position extending around the pipe to be insulated. Preferably, the exposed ends of one segment are shaped to provide a hook configuration and the exposed ends of the anchor of another segment are shaped to provide an eye configuration for receiving the hook shaped configuration.

1 Claim, 7 Drawing Figures

INTERLOCKING REFRACTORY SEGMENTS

FIELD OF INVENTION

This invention relates to refractory components for use in insulating pipes and the like.

PRIOR ART

Refractory segments used for the purposes of insulating pipes in hostile environments such as those of the steel manufacturing industry are of two distinct types.

The first type, which is suited for the most hostile environments is one in which a body of refractory material has a metallic anchor member embedded therein. The metallic anchor member is welded to the member which it is intended to insulate in use. An example of this type of refractory segment is described in my prior U.S. Pat. No. 4,134,721 dated Jan. 16, 1979.

In the other type of refractory segment which is presently available, the body of the refractory material of each segment is shaped to interlock with the body of the refractory material of another segment to be retained by means of this interlock on the member which is to be insulated. The second type of refractory segment is not suitable for many hostile environments where the segments are subjected to severe vibrations, which conditions exist in many steel making installations. Refractory material is inherently brittle and is not capable of withstanding shock loading. For this reason, interlocking refractory segments are generally made from ceramic fibers which serve to increase fracture resistance, however this structure is not sufficiently rugged to withstand the hostile environment in which castable refractories are commonly used.

One of the principal difficulties which is experienced with the refractory segments of the type which are welded as previously described, is that the installation of these segments is labour intensive, requiring the services of an individual skilled in the installation of refractory materials and a welder.

I have found that the installation of refractory sgments can be greatly simplified by modifying the exposed ends of the anchor members to permit two segments to be interlocked by means of the exposed ends of the anchor members, thereby to retain the segments on the pipe which is to be insulated without requiring welding of the anchor members to the pipe.

SUMMARY OF INVENTION

According to one aspect of the present invention, there is provided in a refractory segment having a body of refractory material, in which anchor means is embedded, said anchor means having exposed ends at each longitudinal side face of said segment, the improvement wherein said exposed ends of said anchor means are adapted to interlock with exposed end of anchor means of a further refractory segment to secure said first mentioned refractory segment and said further refractory segment in a position encircling the member to be insulated in use.

According to a further aspect of the present invention, there is provided, in a refractory assembly which comprises at least two segments adapted to encircle a member which is to be insulated, each segment comprising a body of refractory material in which anchor means is embedded, said anchor means providing at least one exposed end at each longitudinal side face of each segment, the improvement wherein said longitudinal side face is of at least one of said segments are set back to expose said exposed ends for engagement with the exposed ends of the other of said segments, the exposed ends of the anchor means of one of said segments being adapted to interlock with the exposed ends of the anchor means of the other of said segments, thereby to retain said segments in a position encircling the member to be insulated in use.

According to a further aspect of the present invention, there is provided an interlocking refractory assembly for use in insulating metal pipes which comprises, first and second refractory segments, each comprising a body of refractory material having an arcuate shaped inner face forming a pipe receiving recess and a pair of longitudinal side edges, the longitudinal side edges of a first segment being disposed opposite the longitudinal side edges of a second segment to provide a pair of opposed side edges when said segments are operably positioned about a pipe in use, at least one of said side edges of each pair of opposed side edges having a set back section, anchor means embedded in the body of each segment, said side edges of each pair of opposed side edges having a set back section, anchor means embedded in the body of each segment, said anchor means having at least one exposed end at each longitudinal side edge, the exposed ends of said anchor means of each segment in which a set back is formed being disposed within said set back, the exposed ends of the anchor means of one segment being adapted to interlock with the exposed ends of the anchor means of the other segment, and said set back at each pair of opposed side edges being proportioned to permit longitudinal relative movement between said segments to effect interlocking when said segments are positioned about a pipe in use.

PREFERRED EMBODIMENT

The invention will be more clearly understood after reference to the following detailed specification read in conjunction with the drawings wherein.

Figure 1:
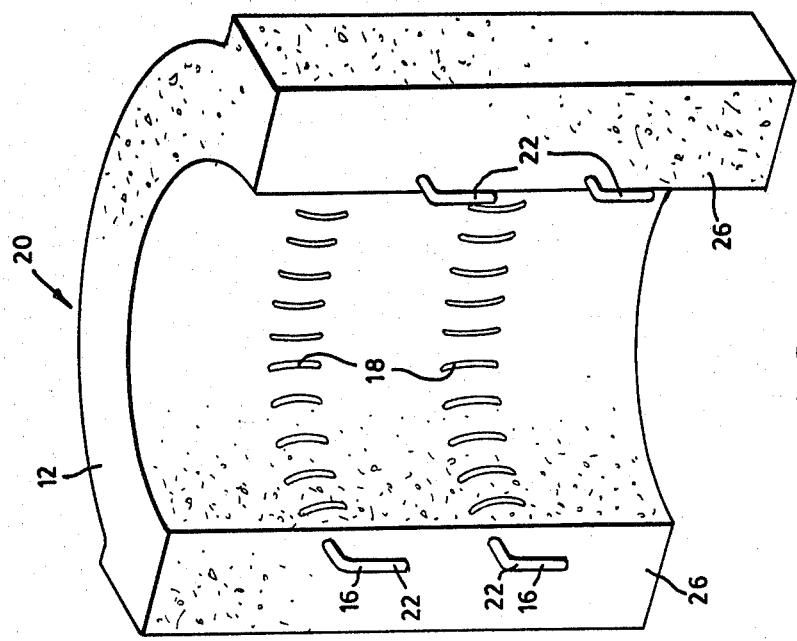
FIG. 1 is a pictorial view of a refractory segment having an anchor member provided therein which has exposed ends shaped to provide an interlocking eye.
Figure 2:
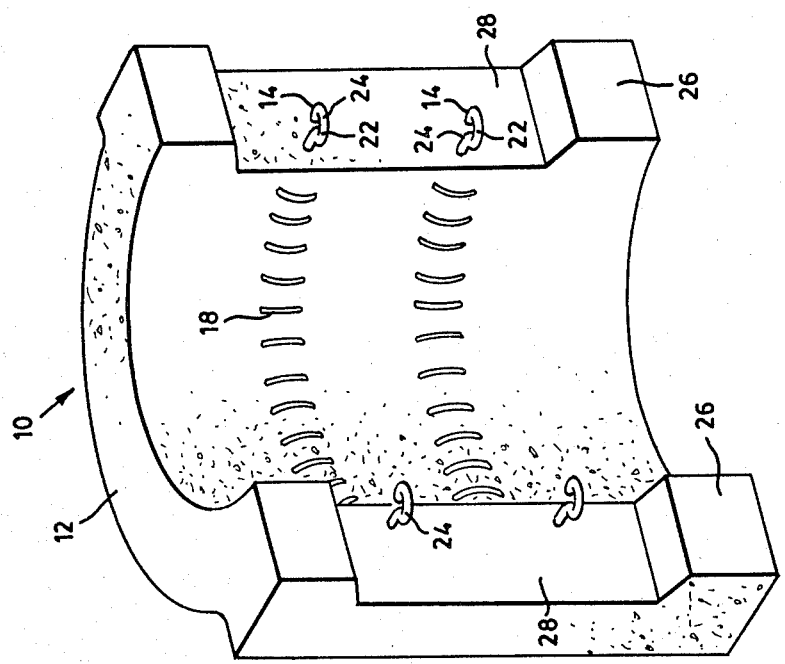
FIG. 2 is a pictorial view of a refractory segment having an anchor assembly embedded therein in which the exposed ends have a hook configuration.

With reference to FIGS. 1 and 2 of the drawings, reference numeral 10 appears generally to a first refractory segment and the reference numeral 20 refers generally to a second refractory segment. The refractory segments 10 and 20 are made from a body 12 of castable refractory material such as manufactured by Plibrico Canada Limited. The body 12 may have reinforcing metal needles dispersed therethrough. A pair of anchoring members 14 of a first type bar embedded in the body 12 of the first segment 10, and a second pair of anchor members 16 are embedded in the body 12 of the second refractory segment 20. The anchor members each consist of a coiled wire 18 and a rod 22. The rod 22 is secured as by welding to several of the turns of the coil 18 thereby serving to maintain the various turns of the coil 18 in an open configuration to provide good anchoring within the body 12. An eye 24 is formed at each end of each rod 22. The longitudinal side faces 26 of the first segment 12 are each formed with a set back 28. The depth of the set back 28 increases progressively from the outer end thereof toward the inner end such that the setback is wedge-shaped and when it is subsequently plugged, the plug is wedged in the recess formed by the set back.

The second segment 20 differs from the first segment 10 in that the longitudinal side faces 26 are not formed with a set back, and the opposite ends of the anchor rods 22 are formed with a hook shaped element 30.

Figure 3:
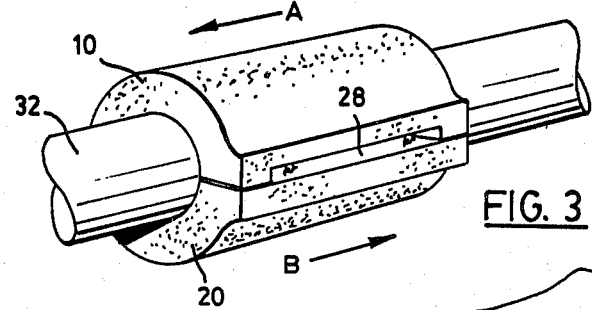
FIG. 3 is a pictorial side view of a refractory assembly mounted on a pipe member which is to be insulated in accordance with an embodiment of the present invention.

In use, the segment 10 is positioned around the pipe 32 which is to be insulated as shown in FIG. 3 of the drawings, and the segment 12 is positioned with the longitudinal end faces 26 of the two segments abutting, and the hook shaped ends 30 of the anchor rods 22 of the second segment 20 projecting into the set back 28.

Figure 4:
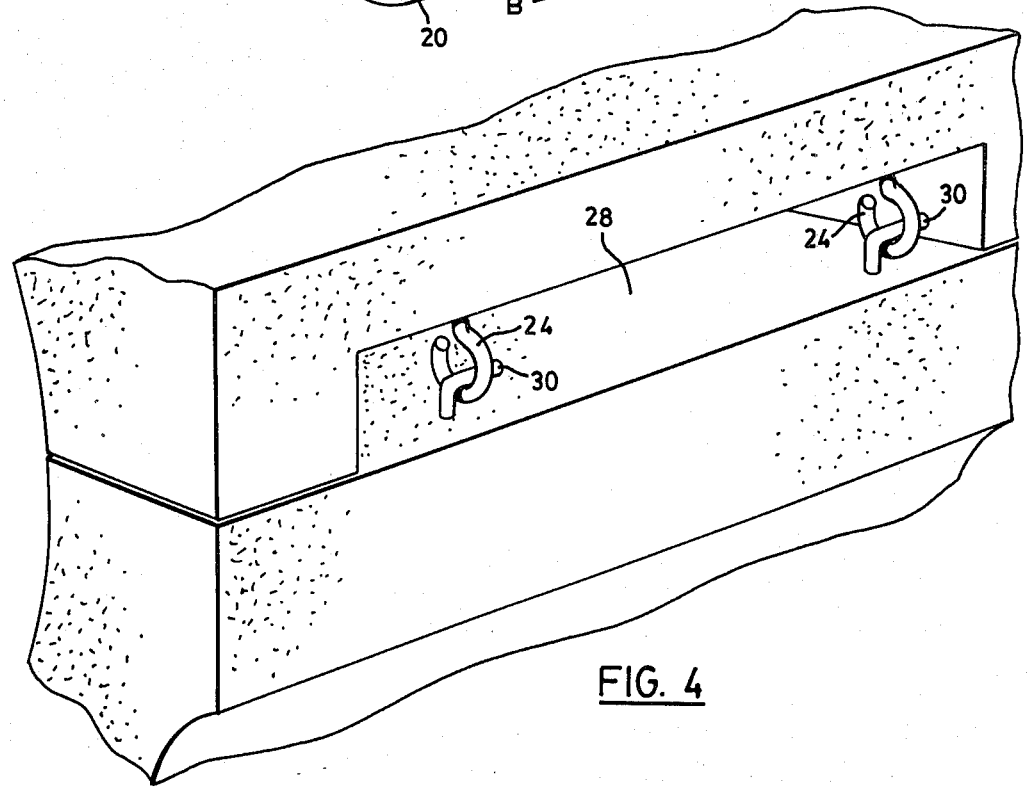
FIG. 4 is an enlarged detail view of the interlocking structure of the anchor mechanisms of FIG. 3.

By moving the first segment 10 in the direction of the arrow A and or the second segment 20 in the direction of the arrow B, the hook shaped ends 30 are caused to enter the eye shaped ends 24 as shown in FIG. 4 of the drawings such that the first and second segments are maintained in an interlocked relationship so as to be self supported on the pipe 32. The fit between the hook shaped ends 30 and the eye 24 of each interlocking anchor assembly is such as to permit a substantial degree of freedom of movement to accommodate variations in the diameter of the pipe 32. Such variations in diameter frequently occur as a result of the accumulation of scale on the pipe 32 in many steel plant applications.

From the foregoing it would be apparent that refractory segments having interlocking anchor mechanisms of the type described above can be assembled with ease by personnel skilled in the installation of refractory material without requiring the assistance of a skilled welder. After the interlocking refractory segments have been assembled as previously described, the gap formed by the set back 28 is filled with a rammable refractory material, as is any gap which may be formed between the oppositely disposed longitudinal side faces 26 of the assembled segments.

Various modifications of the present invention will be apparent to those skilled in the art.

Figure 5:
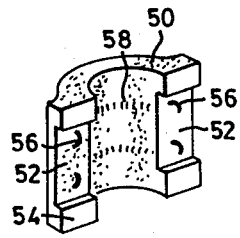
FIG. 5 is a pictorial view of a refractory segment constructed in accordance with a further embodiment of the present invention.
Figure 6:
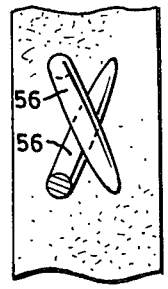
FIG. 6 is a plan view illustrating an alternative interlocking configuration.
Figure 7:
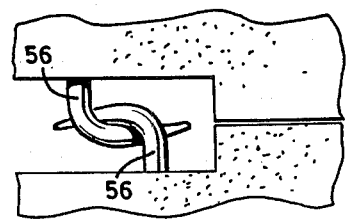
FIG. 7 is a side view of the interlocking configuration of FIG. 6.

As shown in FIG. 5 of the drawings, a refractory segment 50 may be formed with set backs 52, and each longitudinal side face 54. The ends 56 of the anchor members 58 may be hook members which are angularly offset as shown in FIGS. 5 and 6 whereby two substantially identical segments 50 may be interlocked with one another, thereby dispensing with the need to provide two distinctly different refractory segments. By laterally inclining the hook shaped elements 56, it is merely necessary to invert one segment 56 prior to installation so that it is oriented to cause the oppositely disposed hook shaped members 56 to interlock with one another when mounted as previously described with reference to FIG. 3 of the drawings.

These and other modifications of the present invention will be apparent to those skilled in the art. As previously indicated, the refractory segments 10 and 20 may be made from a high strength castable refractory material such as which may be fortified by a measured mixture of stainless steel fibres interlaced therewith to enhance flexural strength, and maximize resistance to mechanical abuse, spalling and thermoshock. The anchor assemblies made each consist of a coiled wire having a thickness of 0.109 inches and a coil diameter of 1.25 inches and a coil pitch of 0.5 inches. The rods 14 are preferably made from stainless steel and a typical rod is made from 310 stainless steel and has a 0.25 inch diameter.

From the foregoing it will be apparent that the refractory segments constructed in accordance with the present invention are inexpensive to manufacture and are capable of being self supporting without requiring the services of a welder in their installation. These and other advantages of the refractory segments of the present invention will be apparent to those skilled in the art.

I claim:

1. A refractory segment comprising:
   (a) a body of refractory material having an inner face formed to provide a pipe receiving channel, an outer face spaced outwardly from said inner face, a pair of longitudinal side faces extending laterally, one on either side of said channel and an end face at each end of said body,
   (b) a setback formed in at least one of said side faces, said setback being in the form of a recess which has an inner face spaced inwardly from its associated side face and each end face of the body to form an abutment between said inner face and each end face, each recess opening laterally outwardly through said outer face whereby the interior of each recess is visible from the exterior of the body,
   (c) at least two anchor members embedded in said body, each anchor member having exposed end faces projecting one from each longitudinal side face of said body, said anchor members being arranged such that the exposed ends thereof project from each end face in which a setback is formed and are arranged to be disposed within the setback so as to be visible from the exterior of the body,
   (d) the exposed ends of said anchor means being adapted to interlock with the exposed ends of the anchor means of another segment,
   (e) said setback being proportioned to permit and said exposed ends being arranged to permit longitudinal relative movement between a pair of oppositely disposed segments to effect interlocking of the exposed ends when the segments are positioned about a pipe in use.

* * * * *